May 6, 1941.  E. F. WAIT ET AL  2,241,227
TIRE
Filed Dec. 17, 1936  2 Sheets-Sheet 1

INVENTORS
Edgar F. Wait
AND
James E. Hale
BY Albert L. Ely
ATTORNEY

May 6, 1941.                E. F. WAIT ET AL                2,241,227
                                 TIRE
                         Filed Dec. 17, 1936            2 Sheets-Sheet 2

INVENTORS
Edgar F. Wait
AND
James E. Hale
BY Albert L. Ely
ATTORNEY

Patented May 6, 1941

2,241,227

UNITED STATES PATENT OFFICE 2,241,227

TIRE

Edgar F. Wait, Detroit, Mich., and James E. Hale, Akron, Ohio, assignors to The Firestone Tire & Rubber Company, Akron, Ohio, a corporation of Ohio Application December 17, 1936, Serial No. 116,312

1 Claim. (Cl. 152—209)

This invention relates to pneumatic tires, and more especially it relates to the structure of pneumatic tires having extremely high traction elements, such as are used, for example, on tractors in cane fields and rice fields.

In tires of the character mentioned, the height of the traction elements may be as much as 20% of the total radial height of a section of the tire. If these tires are manufactured in the usual, well known manner, there is considerable separation of the tread slab from the fabric carcass of the tire due to the unusually large flow of rubber in said tread during the molding of the tire. Another objection to the foregoing method is that the large flow of tread rubber required in the formation of the traction elements frequently results in the formation of undesired concavities in the fabric carcass of the tire. One way of overcoming this difficulty is to build up the unvulcanized tire by adding traction elements to the tread thereof, which elements almost exactly fit the grooves in the mold in which the tire subsequently is vulcanized. Although this method produces tires of satisfactory quality, the cost of the tires is so great as to be prohibitive.

The chief objects of this invention are to provide tires having extremely high traction elements; to bring the cost of manufacturing such tires within a competitive range; and to provide improved construction in tires of the character mentioned. More specifically the invention aims to obviate separation of the tread from the underlying fabric plies during the molding and vulcanizing of tires formed with extremely high traction elements. Other objects will be manifest.

Figure 3:
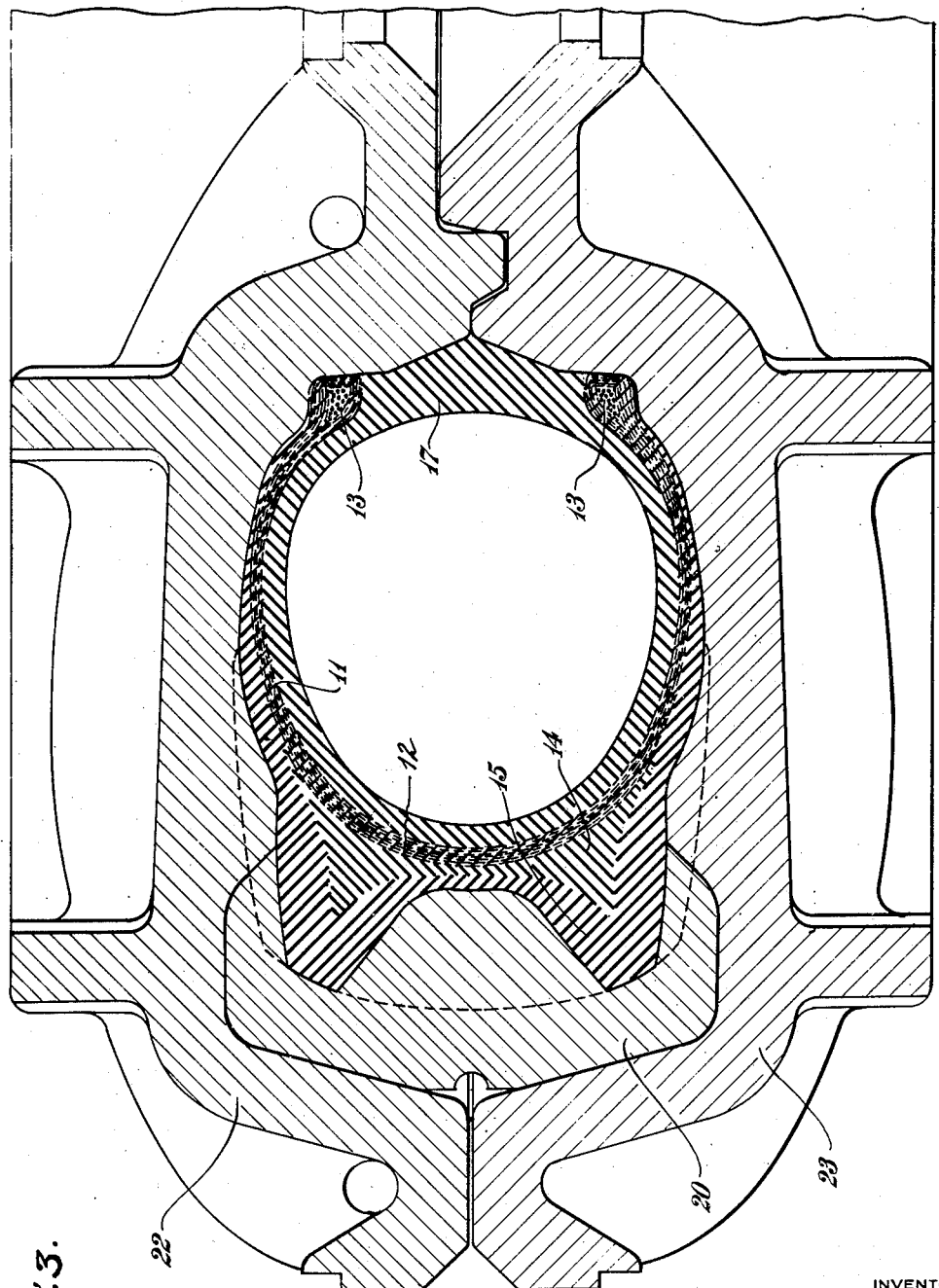
Figure 3 is a cross section of the tire of Figures 1 and 2 and a mold within which the tire is vulcanized.

An embodiment of the present invention is illustrated in Figure 3, shown in the mold in which it is vulcanized. The tire is one in which the height of the tread configuration is very large as compared to the cross section of the tire. A special process, disclosed and claimed in our divisional application Serial No. 337,248, filed May 25, 1940, is used in making the tire.

The tire has the usual carcass plies 11 of rubberized fabric, breaker strips 12, and beads 13. During the fabrication of the tire, a layer of soft rubber is placed over the built-up fabric carcass 11 and a tread slab 15 of relatively stiff, tough, abrasion-resisting rubber composition such as includes carbon black pigment is placed over said soft layer. The tread slab extends well beyond the lateral margins of the soft layer 14, so that the latter is completely surrounded by the tread slab. After the tire is fabricated, it is shaped in the conventional manner, an expansible core 17 is mounted therein, and the fabricated unit is placed in a mold having separable sections 22 and 23 and vulcanized. The heat of vulcanization softens the layer 14 before it does the tread layer 15, so that the layer 14 flows outwardly opposite the deep recesses of the mold cavity and forces the outer tread layer 15 into these recesses to form the high traction elements having soft rubber cores.

Figure 1:
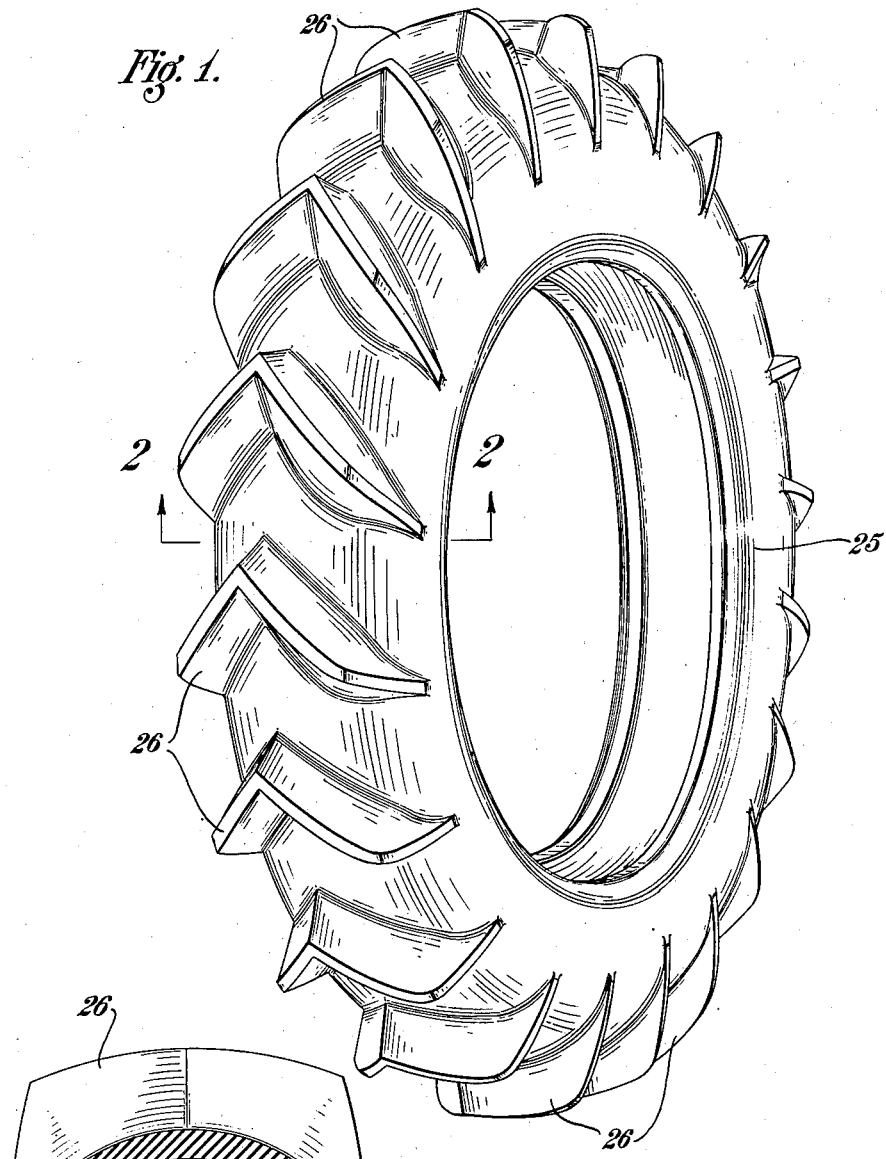
Figure 1 is a perspective view of a pneumatic tire embodying the invention and made according to the improved method thereof.
Figure 2:
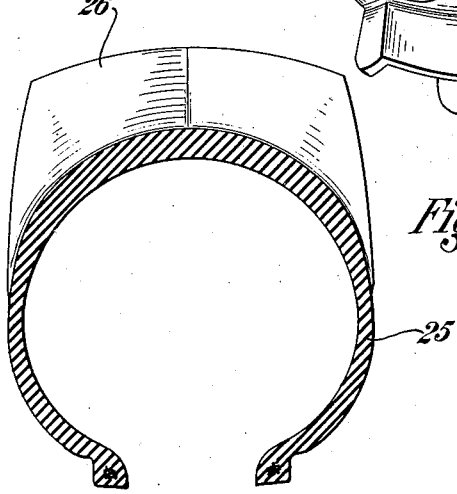
Figure 2 is a section, on a larger scale, on the line 2—2 of Figure 1 showing the relative sectional height of the tire and the traction elements.

A finished tire according to the present invention is shown in Figure 1 wherein the tire generally is designated 25, and 26, 26 are the traction elements thereof. As shown, the height of the elements 26 is substantially 20% of the total height of the radial section of the tire. Obviously the elements 26 may be of different shape than shown.

By the use of the layer of soft, readily flowable rubber composition under the tread slab, the molding of tires having relatively tall traction elements has been simplified, the interior of the tire casing is uniformly smooth and free from recesses or concavities under the tread, and the manufacture of the tires made commercially practicable. Furthermore, the rubber composition 14 retains its relatively soft character even after vulcanization, with the result that torsional strains on the elements 26, incidental to use, are distributed over a larger area of the carcass of the tire, and said elements have a measure of resiliency that permits such relative movement between adjacent elements, during use, as materially to contribute to the automatic ejection of mud and soil from between the elements.

Modification may be resorted to without departing from the spirit of the invention or the scope of the appended claim, which is not limited wholly to the specific construction shown.

What is claimed is:

A pneumatic tire having a carcass and a tread having very tall traction elements, a layer of soft rubber integrally attached to said carcass and having outwardly extending projections, a tough abrasion-resisting outer tread layer of rubber composition integrally united to said soft layer and projections, whereby said projections serve as cores to said traction elements.

EDGAR F. WAIT.
JAMES E. HALE.